United States Patent [19]

Cooke et al.

[11] 4,387,652
[45] Jun. 14, 1983

[54] FURNACE

[75] Inventors: Jeremy C. R. Cooke, Edgbaston; Frederick H. Tilley, Broxbourne, both of England

[73] Assignee: Foster Wheeler Power Products Limited, London, United Kingdom

[21] Appl. No.: 347,936

[22] Filed: Feb. 11, 1982

Related U.S. Application Data

[63] Continuation of Ser. No. 147,592, May 7, 1980, abandoned.

[30] Foreign Application Priority Data

May 9, 1979 [GB] United Kingdom ................. 7915987

[51] Int. Cl.³ .............................................. F23G 5/04
[52] U.S. Cl. .................................... 110/224; 110/259; 34/167; 414/213
[58] Field of Search ................. 110/235, 346, 242–244, 110/255, 256, 117, 118, 101 CC; 34/167, 168, 170; 432/96; 414/213; 222/330

[56] References Cited

U.S. PATENT DOCUMENTS

| | | | |
|---|---|---|---|
| 2,297,289 | 9/1942 | Collis et al. | 414/213 |
| 2,748,497 | 6/1956 | Berg et al. | 222/330 |
| 3,365,812 | 1/1968 | Borrow | 34/167 |
| 3,704,011 | 11/1972 | Hand et al. | 414/213 |
| 3,861,333 | 1/1975 | Krumm | 110/259 |
| 4,030,984 | 6/1977 | Chambers | 201/25 |
| 4,186,668 | 2/1980 | Tabel | 110/224 |
| 4,203,374 | 5/1980 | Frederick | 110/259 |
| 4,212,114 | 7/1980 | Wentzel | 34/167 |

FOREIGN PATENT DOCUMENTS

| | | |
|---|---|---|
| 2609090 | 9/1977 | Fed. Rep. of Germany . |
| 333021 | 8/1930 | United Kingdom . |
| 1523886 | 9/1978 | United Kingdom . |

*Primary Examiner*—Henry C. Yuen
*Attorney, Agent, or Firm*—Andrus, Sceales, Starke & Sawall

[57] ABSTRACT

Pieces of shredded tires are fed into the top of a vertical pyrolyzing furnace in a measured amount using a weighing hopper feed mechanism. Heated gas is introduced through inlet and pyrolyzing the tire pieces on a countercurrent flow principle to produce useful hydrocarbon volatiles and residues. The pyrolyzed residue including tire reinforcing wires are efficiently removed from the furnace by a plurality of downwardly inclined screw conveyors disposed in troughs. Each screw conveyor extends into an inclined conduit and discharges into a vertical branch conduit disposed at least partially within the cross-section of the furnace so that even discharge of the pyrolyzed residue is ensured by the combined action of gravity and the screw conveyors.

14 Claims, 7 Drawing Figures

FURNACE

This application is a continuation of application Ser. No. 147,592, filed May 7, 1980, now abandoned.

This invention relates to a furnace for heating solid material and is particularly, though not exclusively, concerned with a furnace for the pyrolytic heating of shredded vehicle tires for the purpose of recovering volatile hydrocarbon products and residues.

The pyrolytic heating of vehicle tires presents a number of handling problems. It is a disadvantage in terms of energy consumption to have to shred vehicle tires to avoid the necessity of having to pyrolyse whole vehicle tires which may be of widely varying sizes. The problem with vehicle tires, even shredded ones, is that it is difficult to handle these particularly in view of the increasing use of steel-braced tires which leave pieces of steel wire in the residue after pyrolytic treatment. These wires tend to bind the residue together making it difficult to remove from the furnace, particularly with large pieces of shredded tire material.

It has been proposed for furnaces generally to remove solid material by means of a mechanism including a screw conveyor disposed in a trough below the furnace. The screw conveyor may be vertically mounted (see for example, GB PS No. 333021) or horizontally mounted (see for example DT OS No. 2609090 or U.S. Pat. No. 4,030,984). However, the applicants have found that vertically mounted screw conveyors suffer from the disadvantage that they do not withdraw the solid material evenly from the furnace over the cross-sectional area thereof with the result that the efficiency of the pyrolysis process suffers. The applicants have also found that horizontally mounted screw conveyors suffer from the disadvantage that particularly with tire residue containing wire, there tends to be an undue hold-up of the solid material at the entrance to the conveyor. It is to be noted that U.S. Pat. No. 4,030,984 attempts to avoid this problem by pyrolysing whole tires on a conical support so that the reinforcing wires remain on the support. However, this is an inefficient way of pyrolysing tires and problems arise because the reinforcing wires have to be periodically removed from the furnace.

It is therefore an object of the present invention to provide a furnace having an improved handling system for the solid residue.

According to the present invention, there is provided a furnace for heating pieces of solid material comprising a housing in which the solid material is heated in use, a mechanism for feeding solid material into an upper part of the housing, a mechanism for removing heated solid material from a lower part of the housing, and means for supplying a heating gas to the housing so as to heat the solid material during movement of the latter from the feeding mechanism to the removing mechanism, wherein the removing mechanism includes at least one screw conveyor which extends in an inclined fashion into the housing so that an inner end of the screw conveyor is disposed at a higher location within the housing than the part of the screw conveyor which passes through the wall of the housing, and a trough disposed in the housing below said screw conveyor, whereby the solid material which has been heated is removed from the housing by a combination of gravity and the action of the inclined screw conveyor.

In a preferred embodiment, a plurality of inclined screw conveyors extend into the housing, each with its own trough, the screw conveyors being spaced angularly apart around the housing.

The screw conveyors may be inclined at an angle of 30° to 70° to the horizontal although an angle of 45° is preferred.

In a highly preferred embodiment, more than two equiangularly spaced, inclined screw conveyors extend into the housing.

Preferably, flighting on each screw conveyor increases in pitch and height from the inner end of the conveyor to the wall of the housing.

Most advantageously, the or each screw conveyor discharges into a substantially vertically extending conduit which is disposed at least partially within the cross-sectional area of the housing.

Preferably, a lower part of the or each screw conveyor which extends externally of the housing is itself housed in an inclined conduit provided with the substantially vertical conduit. With such a construction, it is preferred to arrange for the substantially vertical conduit to open into the inclined conduit at a section of the screw conveyor which is substantially un-flighted, there being a portion of reverse flight below the junction between the branch conduit and the inclined conduit to prevent unwanted accummulation of pyrolysed solid material in the inclined conduit.

It is highly preferred for the heating gas supply means to be disposed below the trough or troughs. In a construction where more than one screw conveyor and associated trough is provided, it is preferred for an opening to be provided between the troughs for passage of the heating gas.

Conveniently, the solid material feeding mechanism comprises a device for periodically feeding a predetermined quantity of solid material into the housing.

Preferably, such a device takes the form of an assembly comprising an upper feed duct, at least one receptacle which can be moved from a position in which it is disposed below the upper feed duct to a position in which it discharges into a or a respective lower feed duct which discharges into the housing, and means for moving the receptacle(s). Preferably, two receptacles are provided and disposed so that, in each position, a respective one of the receptacles is in a filling position below the upper feed duct and the other receptacle is in a position in which it discharges the contents thereof into the respective lower feed duct.

Preferably, the means for moving the receptacle(s) is sensitive to the weight of material in the receptacles.

An embodiment of the present invention will now be described, by way of example, with reference to the accompanying drawings, in which.

Figure 1:
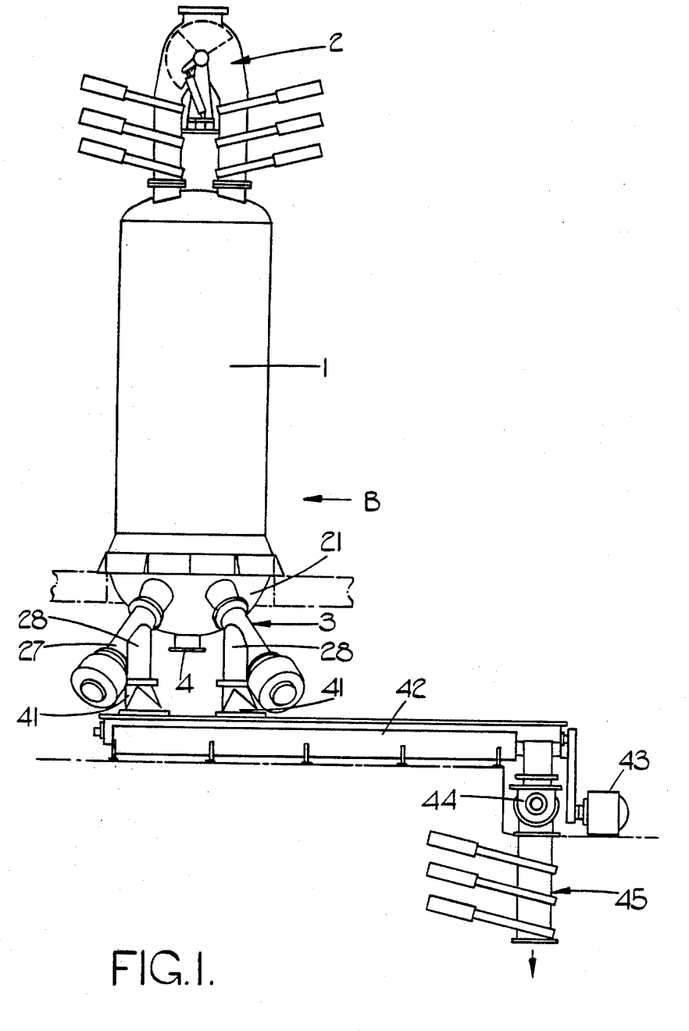
FIG. 1 is a side elevation in the direction of arrow A in FIG. 2 of one embodiment of reactor according to the present invention.
Figure 3:
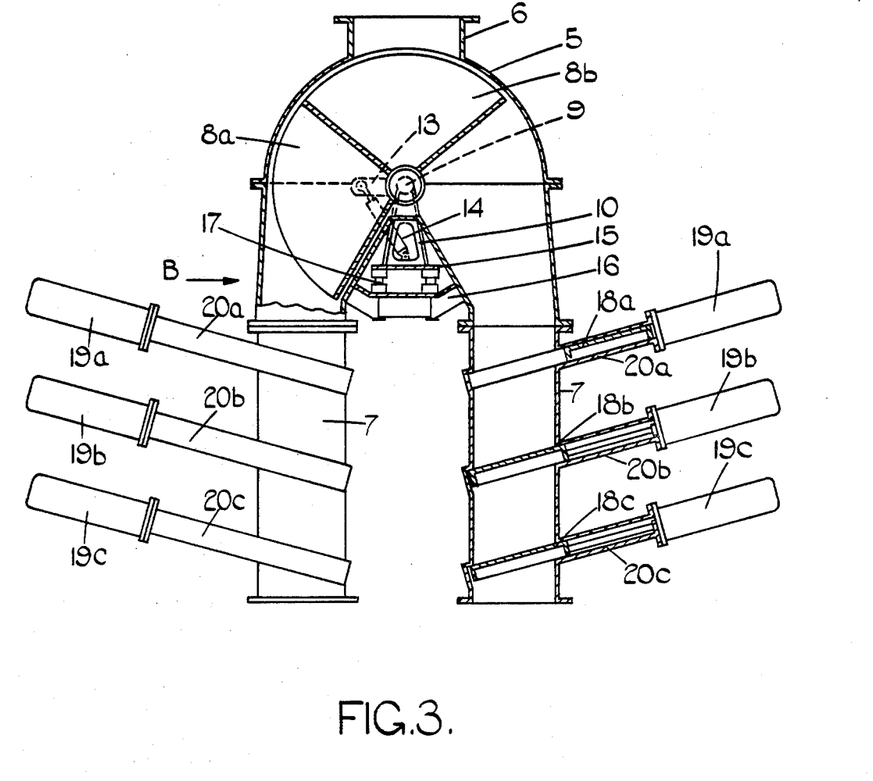
FIG. 3 is a part-sectional view illustrating a feed mechanism of the furnace of FIG. 1, the section being taken on the line A—A of FIG. 4.
Figure 4:
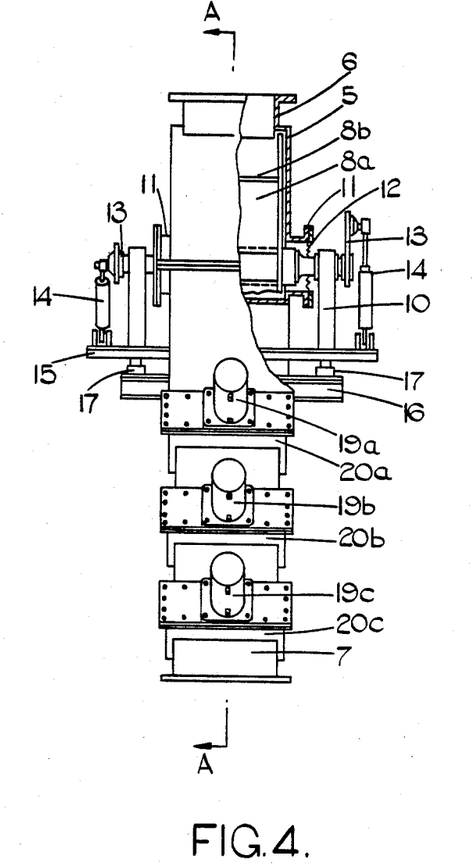
FIG. 4 is a view in the direction of arrow B in FIG. 3.

Referring now to the drawings, the furnace is for pyrolysing shredded rubber tires to produce oils and solid residues. The furnace comprises a vertically disposed cylindrical housing 1 of circular cross-section, a mechanism 2 for feeding shredded tire material to be treated into the housing 1, a mechanism 3 for removing pyrolysed tire material downwardly from the housing 1, and an inlet 4 for admission of heating gas into the housing 1. The mechanism 2 is disposed to discharge shredded rubber tires into the top of the housing 1, is shown in more detail in FIGS. 3 and 4 and is fed by an inclined feed conveyor C. The mechanism 2 includes a sectional hollow body 5 having a rectangular upper feed duct 6 at its top. The hollow body 5 is bifurcated at its lower end to provide a pair of vertically directed, parallel lower feed ducts 7 which discharge at their lower ends into the housing 1 and which are of rectangular cross-section. Disposed within the hollow body 5 below the upper feed duct 6 but above the lower feed ducts 7 is a pair of receptacles in the form of quadrant hoppers 8a and 8b. The quadrant hoppers 8a and 8b are mounted on a common shaft 9 which is horizontally disposed and which projects at each end through the hollow body 5 to be supported in pedestal bearings 10. At each side of the hoppers 8a and 8b, the shaft 9 extends with clearance through a sleeve 11 forming part of the body 5. The shaft 9 is sealed with respect to the sleeves 11 to prevent any foreign matter entering the feed stream by means of respective flexible diaphragms 12. As can be seen from FIG. 3, the hollow body 5 is split in a horizontal plane passing through the longitudinal axis of the shaft 9 so that each sleeve 11 is formed of two half sleeves formed on respective parts of the body 5. Each end of the shaft 9 projects through the respective pedestal bearing 10 and has one end of an operating lever 13 secured thereto. The other end of each operating lever 13 is secured to the piston rod of a respective hydraulic or pneumatically operated piston and cylinder device 14 which is pivotally secured to a platform 15 upon which the pedestal bearings 10 are supported. The platform 15 is itself supported on a base frame 16 through the intermediary of load cells 17 or the like. Thus, the quadrant hoppers 8a and 8b are supported on the load cells 17. The piston and cylinder devices 14 are arranged to be operated so that they can move the quadrant hoppers 8a and 8b from a position in which the quadrant hopper 8a lies under the upper feed duct 6 and the quadrant hopper 8b is in a position to discharge into the right-hand lower feed duct 7 as viewed in FIG. 3, and a position in which the quadrant hopper 8b is disposed under the upper feed duct 6 and the quadrant hopper 8a is disposed to discharge into the left-hand lower feed duct 7 as viewed in FIG. 3, this latter position being the one illustrated in FIG. 3. This movement occurs by movement of the shaft 9 through an angle of approximately 100°. One of the levers 13 is central with the quadrant hoppers 8a whilst the other lever 13 is central with the quadrant hopper 8b. In operation, shredded tire material is discharged via feed conveyor C and the upper feed duct 6 into whichever of the two hoppers 8a and 8b is disposed below the feed duct 6. Discharge continues until the load cells 17 have detected a predetermined weight of material in this hopper. When the predetermined weight has been reached, a signal is transmitted to the piston and cylinder devices 14 which are operated to rotate the quadrant hoppers 8a and 8b to bring the filled hopper into a position in which it discharges into the respective lower feed duct 7. Associated with each lower feed duct 7 is a set of three valve plates 18a, 18b and 18c which are reciprocatable by means of hydraulic or pneumatic cylinders 19a, 19b and 19c to control the flow of the tire material into the housing 1 and also to prevent passage of gases from the housing 1 into the feed mechanism. In operation, the signal from the load cells which causes the quadrant hoppers 8a or 8b to discharge, initiates operation of the piston and cylinder device 19a for a predetermined period of time to open the uppermost valve plate 18a. The time during which the valve plate 18a remains open is predetermined to allow for a full discharge therepast of the shredded tire material from the respective hopper 8a or 8b. The valve plate 18a is then closed and the two lower valve plates 18b and 18c are opened and closed in sequence so that in each set there is a minimum of two valve plates which are closed at any one time. There is thus an alternate discharge of shredded tire material into the respective lower feed ducts 7. This automatic feed arrangement gives a better distribution of shredded tire material within the housing 1 than if only a single feed duct arrangement were provided. As can be seen from FIG. 3, each valve plate 18a, 18b and 18c is housed when in its open or retracted position in a slide casing 20a, 20b, 20c which fully houses the respective valve plate 18a, 18b, 18c when the latter is in a fully retracted position. The upper edges of each slide casing 20a, 20b and 20c are provided with sealing strips of soft material and the lower face of the slide casing 18, which is in contact with the valve plate 18a, 18b, 18c, is of wedge form at the end to force the valve plates against the respective sealing strips when in the closed position. The joint between the piston rod of the piston and cylinder device 19a, 19b, 19c and the valve plates 18a, 18b and 18c is made with sufficient flexibility to allow the valve plate to lift bodily against the respective sealing strips. The sealing strips are recessed in respective slide casings 20a, 20b, 20c to prevent them from becoming fouled by falling shredded tire material. In view of the above, it will be seen that a constant, measured quantity of shredded tire material is fed to the housing 1 at all times.

Figure 5:
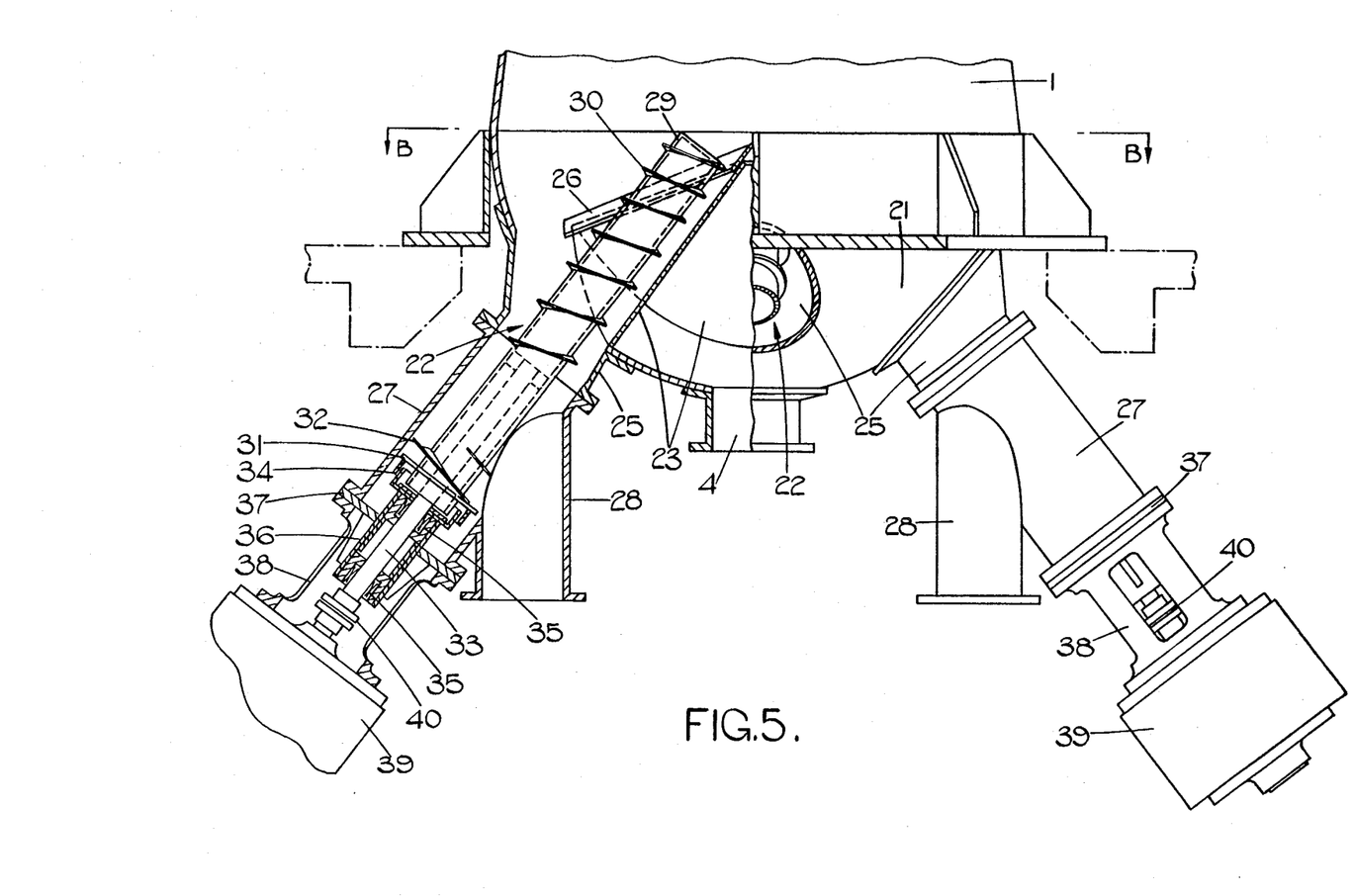
FIG. 5 is a sectional view of part of a discharge mechanism of the furnace of FIG. 1, the section being taken on the line A—A of FIG. 6.
Figures 6, 7:
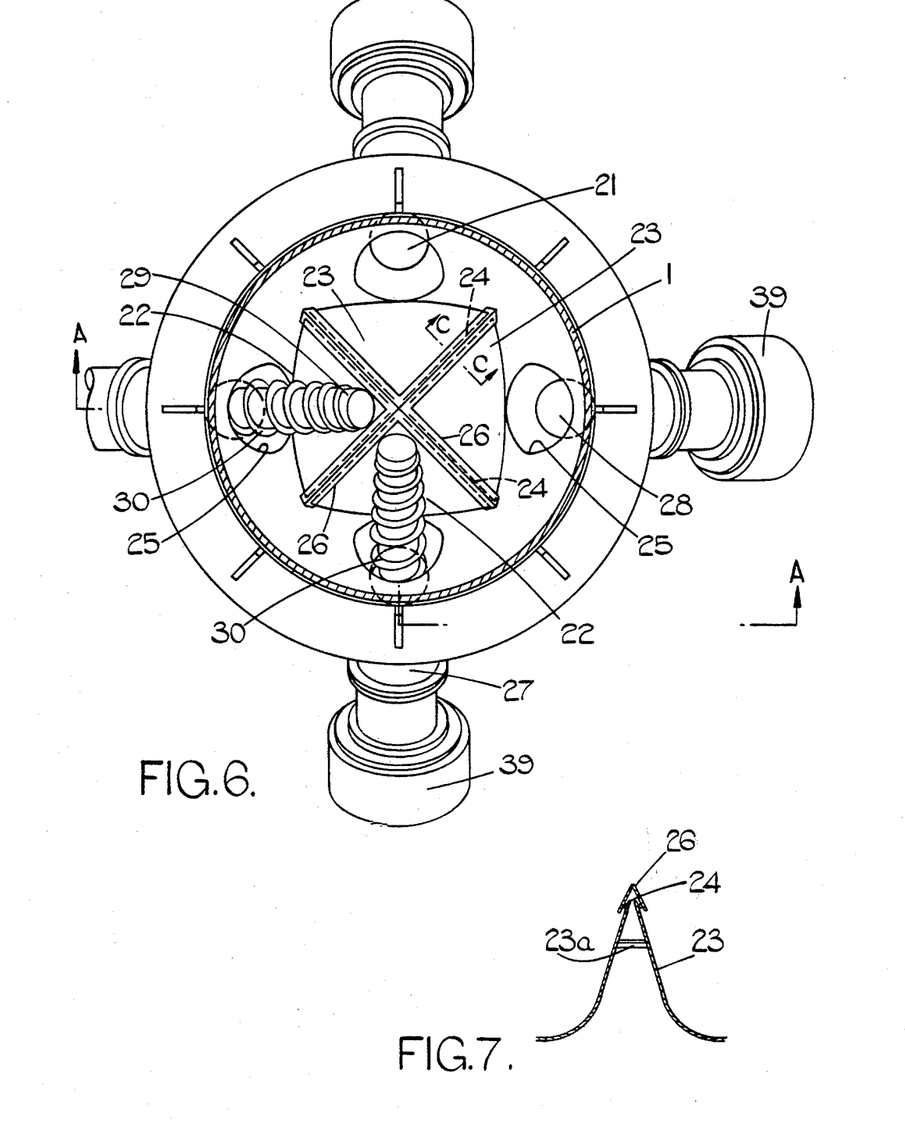
FIG. 6 is a section on the line B—B of FIG. 5.
FIG. 7 is a section on the line C—C of FIG. 6.

The pyrolysed tire material removal mechanism 3 is illustrated in greater detail in FIGS. 5 and 6. The mechanism 3 extends into a lower part spherical section 21 of the housing 1 which forms a closure portion for the lower housing end. The mechanism 3 includes a set of four equiangularly spaced screw conveyors 22 which extend inwardly from exteriorly of the furnace and which are inclined with respect to the longitudinal axis of the housing 1 so that the inner ends of the screw conveyors 22 are disposed at a level in the housing 1 which is higher than the portions of the screw conveyor 22 which pass through the wall of the lower section 21 of the housing 1. The longitudinal axis of each screw conveyor 22 extends at an angle of about 45° to the longitudinal axis of the housing 1. As can be seen from FIG. 6, each screw conveyor 22 extends in the radial sense rather than in the tangential sense into the housing 1 so that its inner end lies near to the longitudinal axis of the housing 1. Disposed under the upper end portion of each screw conveyor 22, i.e. that portion of the screw conveyor 22 which is disposed within the housing 1, is a respective trough 23 which tapers inwardly up to an apex lying at the longitudinal axis of the housing 1. The troughs 23 are spaced apart so as to define four equiangularly spaced slots 24 which are intercommunicating at the axis of the housing 1.

In order to maintain the required width of slots 24 and the troughs 23 in the required relative dispositions, the troughs 23 are attached to each other by a series of tie bars 23a (FIG. 7).

At their lower, outer ends, the troughs 23 are sealed with the inner wall of the lower section 21 of the housing 1 just below respective unions 25 through which the screw conveyors 22 pass. Thus, apart from the provision of the slots 24, the space in the housing 1 above the troughs 23 is sealed from the space below them. The inlet 4 opens into the space below the troughs 23 and passage of heated gas from the inlet 4 through the slots 24 directly upwardly is prevented by the provisions of inverted V-section baffles 26 which are anchored to adjacent troughs 23 so as to lie above the slots 24.

As can be clearly seen in FIG. 5, each union 25 has a relatively large area where it opens into the housing 1 and, at its lower end, each union 25 has a respective inclined duct 27 secured thereto. Each inclined duct 27 is provided with its own vertical branch duct 28 adjacent its upper end. As can be seen from FIGS. 5 and 6, each vertical duct 28 has a substantial proportion of its cross-sectional area disposed within the cross-sectional area of the housing and directly below closure portion 21. A large gap or clearance is provided between the screw conveyor 22 and the upper portion of the respective union 25. This arrangement avoids the formation of an undue restriction and so facilitates passage of solid material into and through the duct 28. Each screw conveyor 22 consists of a core tube 29 around which is formed a helical flight 30 which varies both in height and pitch so that it is of at least height and narrowest pitch at the inner end and increases both in height and pitch towards the union 25 and as it passes through closure portion 21. The flight 30 terminates at a point where the core tube 29 enters the inclined duct 27 immediately above the vertical duct 28. The core tube 29 is unflighted below the flight termination point and itself terminates just beyond the outer limit of the opening to the vertical duct 28 from the inclined duct 27. The core tube 29 is fitted with a deflector plate 31 in line with the aforesaid outer limit of the opening. Inwardly of the deflector plate 31, the core tube 29 is fitted with about 1½ turns of reverse flight 32 to prevent any build-up of pyrolysed tire material at this point. The core tube 20 terminates at its outer end in a drive shaft 33 which passes through a labyrinth seal unit 34 and a pair of bearings 35 located at opposite ends of a bearing support tube 36 carried by the inclined duct 27 through the intermediary of a mounting plate 37. A support tube 38 is also mounted on this plate 37 and carries a drive motor 39 which is operably connected with the drive shaft 33 through the intermediary of a flexible coupling 40. The motor 39 has a speed and power suitable for extraction of the residue material. The motor 39 may be a variable speed motor.

Figure 2:
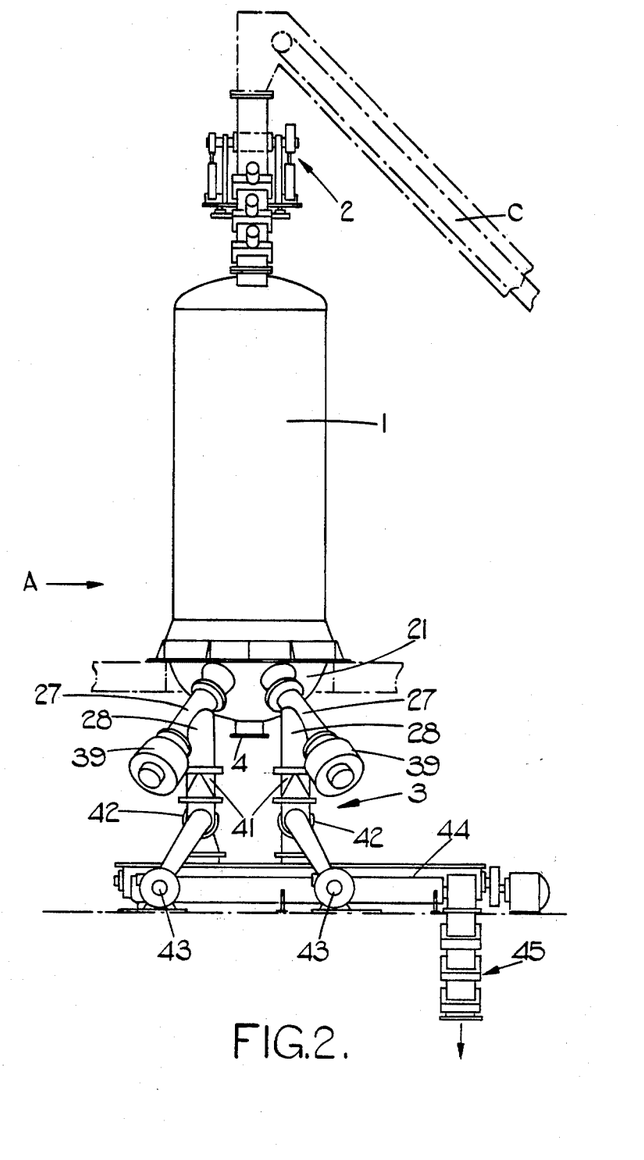
FIG. 2 is a side elevation in the direction of arrow B in FIG. 1.

The two vertical ducts 28 on each side of the housing 1 discharge via a sealed union 41 into a common, fully enclosed water jacketted screw conveyor 42. The two screw-conveyors 42 are disposed in parallel relationship and are driven by motors 43 (see FIG. 2). These two conveyors 42 themselves discharge in sealed relationship into a further screw conveyor 44 which is horizontally disposed at right angles to the screw conveyors 42. The further screw conveyor 44 is fully enclosed and may be jacketted to give additional cooling if required.

The further screw conveyor 44 discharges into an outer valve unit 45 which is similar in design to the valve plates 18a, 18b, and 18c operated by the piston and cylinder devices 19a, 19b and 19c.

In use, shredded rubber tire material typically having a nominal size as large as 200 mm×200 mm, is fed into the top of the housing 1 in the controlled manner described hereinabove. Typically, the feed rate is 7,000 kg, per hour. The shredded pieces of rubber tire fall under the action of gravity towards the bottom of the housing 1 to collect as a layer having an average thickness of 4 meters on the troughs 23 and over the conveyors 22. Hot pyrolysing gas (typically at a temperature of 500° C. and being constituted by an oxygen-free recycled product gas from the furnace) is passed into the housing 1 through the inlet 4. The heated pyrolysing gas passes into the layer of tire material in the housing 1 after having passed through the slots 24 covered by the baffles 26. The pieces of tire are thus pyrolysed to yield hydrocarbon vapours and a solid residue which includes any steel wire reinforcement which may have been present in the tire feedstock. The thickness of the layer of bed of material being pyrolysed is maintained by supply of fresh material via the mechanism 2. The product gases together with spent pyrolysing gas pass upwardly through the housing 1 in countercurrent fashion to the general flow of rubber tire material through the housing 1. These product gases and spent pyrolysing gases leave the housing 1 through an upper outlet (not shown). The pyrolysed residue which includes the metal reinforcing wires is removed from the housing by a combination of the action of gravity and the screw conveyors 22. The variation in the size and pitch of the helical flights 30, together with the inclined relationship of the screw conveyor 22 with respect to the axis of the housing 1 and the action of gravity, enables a relatively uniform removal of the pyrolysed material over the cross-section of the housing 1. This is important as it assists in maintaining the bed of the material being pyrolysed of even thickness over the cross-sectional area of the housing 1. It is to be appreciated that the maintenance of an even thickness of bed is difficult under normal circumstances because of the presence of the steel reinforcing wires which tend to bind the mass together and render it difficult to transport. The diameters of the core tubes 29 of the conveyors 22 are sufficiently large to prevent the steel wires from wrapping around and becoming entangled with the screw conveyors. After passage out of the housing 1, the pyrolysed tire material is urged by the flights 30 through the inclined ducts 27 and into the vertical ducts 28, compaction of the material at the bottom ends of the ducts 27 being prevented by the provision of the reverse flights 32. From the vertical ducts 28, the pyrolsed material passes into the screw conveyors 42 to be cooled from a temperature of approximately 500° C. to approximately 150° C. before being discharged into the further screw conveyor 44 to be transported out of the assembly via the valve unit 45. The temperature of the pyrolysed material leaving the assembly via the valve unit 45 is typically less than 150° C. and the discharge rate thereof is typically 3500 kg per hour.

It will be appreciated that, by the provision of the valve unit 45 and the valve plates 18a, 18b and 18c, the furnace is completely sealed against ingress of ambient air and the furnace is preferably operated at a pressure slightly higher than atmospheric pressure as a further safeguard against ingress of air.

We claim:

1. A furnace for heating pieces of solid material, comprising:
   (a) a vertically extending housing having a longitudinal axis,
   (b) a closure portion disposed on the lower end of said housing,
   (c) means for feeding solid material into an upper portion of said housing,
   (d) means for supplying a heating gas to the interior of said housing to heat solid material disposed within the housing,
   (e) means assisted by gravity for removing heated solid material from said housing and downwardly through said closure portion,
   (f) said last-named means including at least one screw conveyor extending from the exterior of said furnace and upwardly at an incline to said axis and through said closure portion so that the inner conveyor end is disposed at a higher location within said housing than the part of said conveyor which passes through said closure portion,
   (g) said screw conveyor discharging into a substantially vertically extending conduit which is disposed directly below said closure portion,
   (h) the lower part of said screw conveyor which is disposed externally of said housing being housed in an inclined conduit which opens into said substantially vertically extending conduit, and
   (i) said substantially vertically extending conduit opening into said inclined conduit adjacent a portion of the screw conveyor which is substantially un-flighted, there being a portion of reverse flight below the junction between said substantially vertically extending conduit and said inclined conduit to prevent accumulation of pyrolysed solid material in said inclined conduit.

2. A furnace as claimed in claim 1, wherein a plurality of said inclined screw conveyors extend into said housing, said screw conveyors being spaced angularly apart around the housing, and a trough disposed in said housing below each said screw conveyor.

3. A furnace as claimed in claim 1, wherein flighting on said screw conveyor increases in pitch and height from the inner end of the conveyor and outwardly toward said closure portion.

4. A furnace as claimed in claim 1, wherein said solid material feeding means comprises means for automatically periodically feeding a predetermined quantity of the solid material into the housing.

5. A furnace for heating pieces of solid material, comprising:
   (a) a vertically extending housing having a longitudinal axis,
   (b) a closure portion disposed on the lower end of said housing,
   (c) means for feeding solid material into an upper portion of said housing,
   (d) means for supplying a heating gas to the interior of said housing to heat solid material disposed within the housing,
   (e) means assisted by gravity for removing heated solid material from said housing and downwardly through said closure portion,
   (f) said last-named means including a plurality of circumferentially spaced apart screw conveyors extending from the exterior of said furnace and upwardly at an incline to said axis and through said closure portion so that each inner conveyor end is disposed at a higher location within said housing than the part of each of said conveyors which passes through said closure portion; and
   (g) a trough disposed below each of said screw conveyors and inclined at substantially the same angle as said screw conveyors, each trough forming means for directing downwardly moving material toward its respective conveyor and having a pair of edges which converge upwardly to an apex.

6. A furnace as claimed in claim 5, wherein said screw conveyors and troughs are equiangularly spaced apart, and said apexes are coincident with the longitudinal axis of said housing.

7. A furnace as claimed in claim 5, wherein said edges are disposed along a line oblique to the longitudinal axis of the screw conveyor disposed therebetween.

8. A furnace for heating pieces of solid material, comprising:
   (a) a vertically extending housing having a longitudinal axis,
   (b) a closure portion disposed on the lower end of said housing,
   (c) means for feeding solid material into an upper portion of said housing,
   (d) means for supplying a heating gas to the interior of said housing to heat solid material disposed within the housing,
   (e) and means assisted by gravity for removing heated solid material from said housing and downwardly through said closure portion,
   (f) said last-named means including at least one screw conveyor extending from the exterior of said furnace and upwardly at an incline to said axis and through said closure portion so that the inner conveyor end is disposed at a higher location within said housing than the part of said conveyor which passes through said closure portion, and a trough disposed below said screw conveyor and inclined at substantially the same angle as said screw conveyor, said trough having a pair of edges which converge upwardly to an apex.

9. A furnace as claimed in claim 8, wherein said apex is coincident with the longitudinal axis of said housing.

10. A furnace as claimed in claim 8, wherein a plurality of said inclined screw conveyors extend into said housing, said screw conveyors being spaced angularly apart around the housing, and a trough disposed in said housing below each said screw conveyor.

11. A furnace as claimed in claim 8, wherein flighting on said screw conveyor increases in pitch and height from the inner end of the conveyor and outwardly toward said closure portion.

12. A furnace as claimed in claim 8, wherein said solid material feeding means comprises means for automatically periodically feeding a predetermined quantity of the solid material into the housing.

13. A furnace as claimed in claim 10 wherein said screw conveyors are included at an angle of 30° to 70° to the horizontal.

14. A furnace for heating pieces of solid material, comprising:
   (a) a vertically extending housing having a longitudinal axis,
   (b) a closure portion disposed on the lower end of said housing,
   (c) means for feeding solid material into an upper portion of said housing, (d) means for supplying a heating gas to the interior of said housing to heat solid material disposed within the housing, (e) means assisted by gravity for removing heated solid material from said housing and downwardly through said closure portion, (f) said last-named means including a plurality of circumferentially spaced apart screw conveyors extending from the exterior of said furnace and upwardly at an incline to said axis and through said closure portion so that each inner conveyor end is disposed at a higher location within said housing than the part of each of said conveyors which passes through said closure portion, (g) a trough disposed below each of said screw conveyors and inclined at substantially the same angle as said screw conveyors, each trough forming means for directing downwardly moving material toward its respective conveyor and having a pair of edges which converge upwardly to an apex, (h) said screw conveyor discharging into a substantially vertically extending conduit which is disposed directly below said closure portion, (i) the lower part of said screw conveyor which is disposed externally of said housing being housed in an inclined conduit which opens into said substantially vertically extending conduit, and (j) said substantially vertically extending conduit opening into said inclined conduit adjacent a portion of the screw conveyor which is substantially un-flighted, there being a portion of reverse flight below the junction between said substantially vertically extending conduit and said inclined conduit to prevent accumulation of pyrolysed solid material in said inclined conduit.

* * * * *